(12) United States Patent
Metsch et al.

(10) Patent No.: US 11,340,874 B2
(45) Date of Patent: May 24, 2022

(54) METHODS AND APPARATUS TO RECOMMEND INSTRUCTION ADAPTATIONS TO IMPROVE COMPUTE PERFORMANCE

(71) Applicant: Intel Corporation, Santa Clara, CA (US)

(72) Inventors: Thijs Metsch, Bruehl (DE); Mohammad Mejbah Ul Alam, Milpitas, CA (US); Justin Gottschlich, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/455,259

(22) Filed: Jun. 27, 2019

(65) Prior Publication Data

US 2019/0317737 A1 Oct. 17, 2019

(51) Int. Cl.
*G06F 8/35* (2018.01)
*G06N 20/00* (2019.01)

(52) U.S. Cl.
CPC ............... *G06F 8/35* (2013.01); *G06N 20/00* (2019.01)

(58) Field of Classification Search
CPC ........... G06N 20/00; G06F 8/656; G06F 8/35; G06F 11/36
See application file for complete search history.

(56) References Cited

U.S. PATENT DOCUMENTS

| 2007/0226698 A1* | 9/2007 | Cascaval ............. G06F 9/45516 717/127 |
| 2010/0042976 A1* | 2/2010 | Hines .................. G06F 11/3466 717/127 |
| 2013/0055225 A1* | 2/2013 | Ravi ..................... G06F 8/4441 717/150 |

(Continued)

OTHER PUBLICATIONS

Wikipedia, "Serverless Computing," [https://en.wikipedia.org/wiki/Serverless_computing], retrieved on Sep. 25, 2019, 5 pages.

(Continued)

*Primary Examiner* — S. Sough
*Assistant Examiner* — Cheneca Smith
(74) *Attorney, Agent, or Firm* — Hanley, Flight & Zimmerman, LLC

(57) ABSTRACT

Methods, apparatus, systems and articles of manufacture to recommend instruction adaptations to improve compute performance are disclosed. An example apparatus includes a pattern detector to detect an execution pattern from an execution profile provided by a server, the execution profile associated with an instruction stored in an instruction repository. An adaptation identifier is to identify a possible instruction adaptation that may be applied to the instruction associated with the execution pattern. A model processor is to predict, using a machine learning model, an expected performance improvement of the adaptation. A result comparator is to determine whether the expected performance improvement meets an threshold. An instruction editor is to, in response to the result comparator determining that the (Continued)

expected performance improvement meets the threshold, apply the possible instruction adaptation to the instruction in the instruction repository.

33 Claims, 7 Drawing Sheets

(56) References Cited

U.S. PATENT DOCUMENTS

| | | | | |
|---|---|---|---|---|
| 2013/0346979 | A1* | 12/2013 | Nightingale | G06F 9/44 |
| | | | | 718/100 |
| 2015/0052501 | A1* | 2/2015 | Shani | G06F 11/3688 |
| | | | | 717/124 |
| 2019/0146764 | A1* | 5/2019 | Ravindar | G06F 8/443 |
| | | | | 717/151 |
| 2019/0272171 | A1* | 9/2019 | Chen | G06F 8/77 |

OTHER PUBLICATIONS

Wikipedia, "Microservices," [https://en.wikipedia.org/wiki/Microservices], retrieved on Sep. 25, 2019, 8 pages.

Wikipedia, "Platform as a service," [https://en.wikipedia.org/wiki/Platform_as_a_service], retrieved on Sep. 25, 2019, 5 pages.

Intel, "Intel VTUNE Amplifier," [https://software.intel.com/en-us/vtune], retrieved on Sep. 25, 2019, 8 pages.

Ansel et al., "OpenTuner: An Extensible Framework for Program Autotuning," PACT '14 Proceedings of the 23rd international conference on Parallel architectures and compilation pp. 303-316, Aug. 2014, [https://dl.acm.org/citation.cfm?doid=2628071.2628092], retrieved on Sep. 25, 2019, 13 pages.

Balog et al., "DeepCoder: Learning to Write Programs," ICLR 2017, Mar. 8, 2017, [https://arxiv.org/pdf/1611.01989.pdf], retrieved on Sep. 25, 2019, 21 pages.

PMEM.IO,"Persistent Memory Programming," [https://pmem.io], retrieved on Sep. 25, 2019, 2 pages.

Gottschlich et al., "The Three Pillars of Machine Programming", ArXiv, May 8, 2018, retrieved from https://arxiv.org/pdf/1803.07244.pdf, 11 pages.

* cited by examiner

```
int main() {
    // initialize.
    #pragma omp parallel for
    for(int n=0; n<size; n++) {
      // do something
    }
}
```

FIG. 7

METHODS AND APPARATUS TO RECOMMEND INSTRUCTION ADAPTATIONS TO IMPROVE COMPUTE PERFORMANCE

FIELD OF THE DISCLOSURE

This disclosure relates generally to recommending instruction adaptations, and, more particularly, to methods and apparatus to recommend instruction adaptations to improve compute performance.

BACKGROUND

Function as a service (FaaS), microservices, platform as a service (PaaS), and/or other similar cloud computing services are platforms that allow for the development, execution, and/or management of applications and/or programs. Such applications and/or programs include instruction (e.g., code) blocks and/or functions that may be modular in nature and/or reused for other similar applications and/or programs.

BRIEF DESCRIPTION OF THE DRAWINGS

FIG. 7 represents an example code optimization that may be recommended by the example adaptation controller of FIGS. 1 and/or 2.

The figures are not to scale. In general, the same reference numbers will be used throughout the drawing(s) and accompanying written description to refer to the same or like parts.

Figure 1:
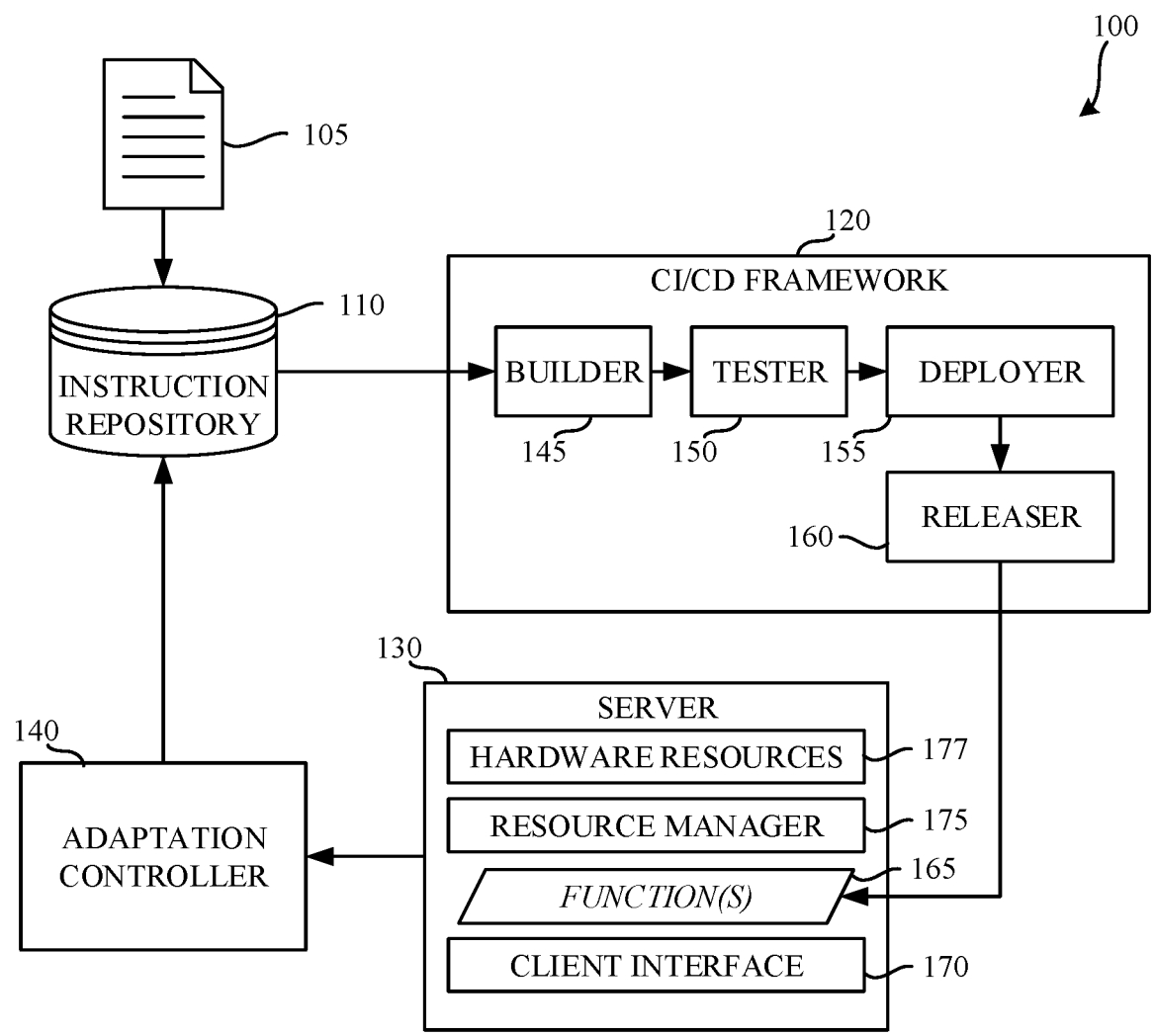
FIG. 1 is a block diagram of an example Function as a Service (FaaS) environment.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

With Function as a Service (FaaS)/Serverless, Microservices, Platform as a Service (PaaS) or similar approaches being used more and more, the trend indicates that instructions are to become more and more generic. The actual developer is separated from the platform that the instructions (e.g., code, scripts, etc.) supplied by the developer will actually be executed upon. In some examples, even the features of the actual execution platform (e.g., the Cloud) might be hidden from the developer (e.g., the type of processor architecture and/or hardware that is to execute the instructions). This leads to generic, non-platform-specific (e.g., un-optimized) instructions. In some examples, the code may have been optimized for execution in a development environment, but not have been optimized for execution in the production (e.g., FaaS) environment.

Based on execution traces/profiles of a set of programs/functions, example approaches disclosed herein utilize machine learning models to identify pieces of a program/algorithm which would benefit most from alterations and/or platform differencing feature(s). Through code annotations and/or an adaptation controller, code modifications are made/suggested to the function and/or underlying code that allow the function to benefit from various code enhancements. Such an approach enables a developer to write generic code, programs, and/or algorithms that can be automatically adapted (e.g., at the server side) to changes in the execution platform. Should the program/algorithm be moved between platforms, or new platform features become available, the underlying code can be adapted on the fly. For example, key-value stores, in some examples, may be enhanced by adding code from a Persistent Memory Development Kit (PMDK) library. In some examples, parallelizable loops can be annotated with directives/pragma statements to make use of libraries like Open Media Library (OpenML), Open Compute Language (OpenCL), etc.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a regression neural network (RNN) model is used. Using an RNN model enables creation of prediction scores (e.g., estimated performance metrics). In general, machine learning models/architectures that are suitable to use in the example approaches disclosed herein will be able to create output values representing a performance metric (e.g., an estimated amount of time to complete an operation). However, other types of machine learning models could additionally or alternatively be used such as, for example, a convolutional neural network (CNN), a support vector machine (SVM), a Long Short Term Memory (LSTM) architecture, etc.

FIG. 1 is a block diagram of an example Function as a Service (FaaS) environment 100. The example environment 100 of the illustrated example of FIG. 1 includes code 105 that is submitted to an instruction repository 110 by a developer. A continuous integration/continuous deployment (CI/CD) framework 120 accesses the code in the repository 110 and deploys the code to a server 130 for execution. An adaptation controller 140 monitors execution of the functions at the server 130 and proposes modifications and/or adaptations to the code stored in the instruction repository 110 to improve execution of that code at the server 130.

The example code 105 of the illustrated example of FIG. 1 represents coded instructions created by a developer. The code 105 may be represented using any past, present, and/or future programming languages, syntaxes, etc. For example, the code 105 may be represented using any of the following languages: C, C++, Java, C#, Perl, Python, JavaScript, HyperText Markup Language (HTML), Structured Query Language (SQL), Swift, etc. In some examples, the developer may develop the code for execution in a development environment. Ultimately, the code may be executed in a production environment different from the development environment. As such, the production environment may have different hardware features available, different libraries available, etc. that may, when used, result in increased performance. The developer might not otherwise be aware of these features and/or libraries, and/or their availability for use in the production environment. Example approaches disclosed herein enable the developer to be made aware of such features, libraries, etc. and improve execution of the code 105, when executed in the production environment.

The example instruction repository 110 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example instruction repository 110 may be in any data format such as, for example, binary data, comma delimited data, tab delimited data, structured query language (SQL) structures, etc. While, in the illustrated example, the instruction repository 110 is illustrated as a single device, the example instruction repository 110 and/or any other data storage devices described herein may be implemented by any number and/or type(s) of memories. In the illustrated example of FIG. 1, the instruction repository 110 stores the code 105 provided by the developer. In some examples, the code 105 stored in the instruction repository 110 may be modified by the example adaptation controller 140.

The example CI/CD framework 120 of the illustrated example of FIG. 1 monitors the code present in the instruction repository 110 and, upon changes to the code, triggers execution of a CI/CD pipeline that leads to the deployment of the code. CI/CD represents the process of periodically and/or a periodically capturing code produced by a developer, and deploying the code into a usable state. The example CI/CD framework of the illustrated example of FIG. 1 includes a builder 145, a tester 150, a deployer 155, and a releaser 160. The example builder 145 monitors the code in the repository and periodically (e.g., hourly, daily, weekly) and/or a periodically (e.g., on demand) builds the code. Building the code results in an executable file and/or other intermediate file (e.g., a script file, a dynamically linked library, etc.) that can be executed and/or interpreted by the server 130 as a function. While examples disclosed herein refer to the deployed function as an executable file, the function may be implemented in any fashion such that the function can be executed at the request of a client device. For example, such functions may be implemented by a container, a script, a library, a virtual machine, a plugin, etc. The example tester 150 performs one or more tests to confirm operation of the built executable file. If the tester 150 confirms that the executable file operates correctly, the example deployer 155 deploys the executable file into a staging area (e.g., on the file system of the server 130). The releaser 160 then releases the deployed executable file, thereby enabling the execution of the function by the server 130.

The example server 130 of the illustrated example of FIG. 1 is implemented by a cloud computing server and includes function(s) 165 that are executed in response to a request received at the client interface 170. The execution of the functions 165 is controlled by a resource manager 175. The example function(s) 165 represent executable code that is provided by the CI/CD framework 120 for execution by the server 130. The example client interface 170 implements a gateway and/or router that allows for a client to trigger the execution of the function and, in some cases, enables the return of a result of the function to the client. The example resource manager 175 manages hardare resources 177 of the server 130. In examples disclosed herein, the resource manager 175 is implemented by a resource management platform such as, for example, KUBERNOTES, OPENSTACK, MESOS, etc. Such resource manager 175 enables the execution of the functions, and provides a profile and/or stack trace for execution of the function to the adaptation engine 140. In examples disclosed herein, the server 130 includes hardware resources 177 under the control of the resource manager 175. Such hardware resources 177 may be heterogeneous (e.g., various CPU revisions, have adjacencies like FPGA, GPUs, etc.), may represent large scaled hardware (e.g., a compute cluster), and/or may represent distributed hardware (e.g., in the cloud, edge, or on-premise).

Figure 2:
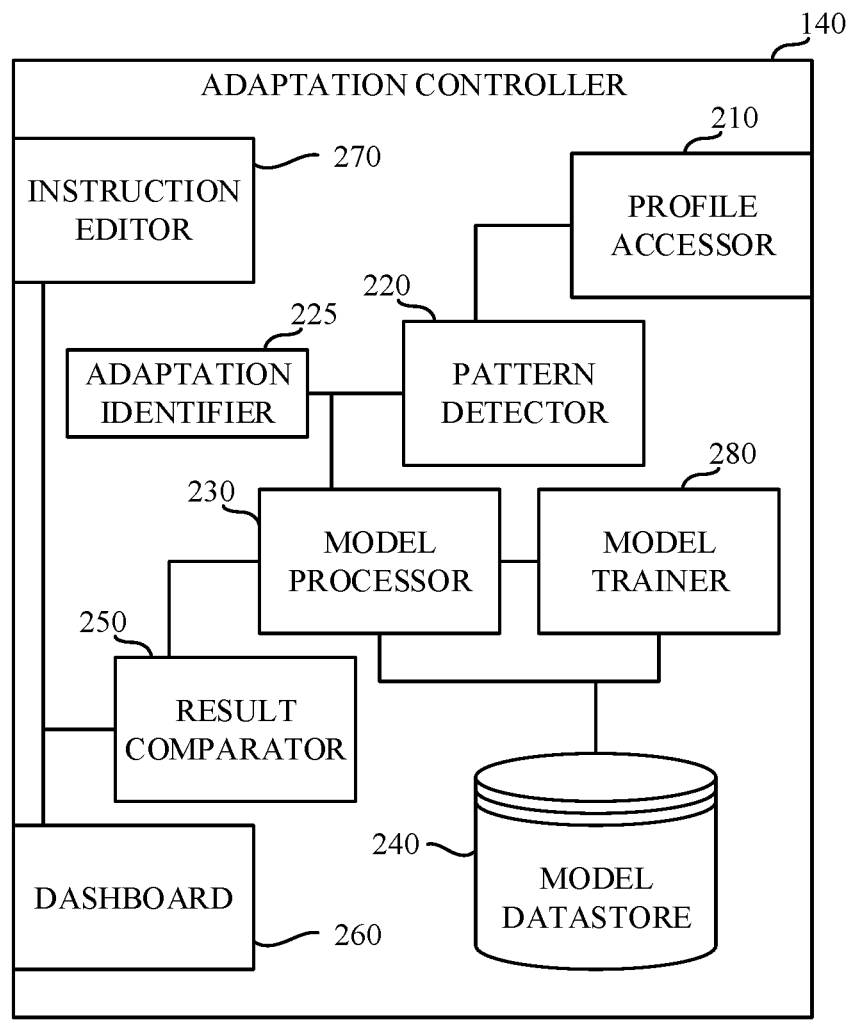
FIG. 2 is a block diagram of the example adaptation controller of FIG. 1.

FIG. 2 is a block diagram of an example implementation of the adaptation controller 140 of FIG. 1. The example adaptation controller 140 accesses (e.g., monitors) profiles and/or stack traces provided by the resource manager 175 of the server 130, analyzes those profiles and/or stack traces, and provides recommendations for code adaptations that may improve the performance of the underlying function(s). The example adaptation controller 140 of the illustrated example of FIG. 2 includes a profile accessor 210, a pattern detector 220, an adaptation identifier 225, a model processor 230, a model data store 240, a result comparator 250, a dashboard 260, an instruction editor 270, and a model trainer 280.

The example profile accessor 210 of the illustrated example of FIG. 2 is implemented by a logic circuit such as, for example, a hardware (e.g., semi-conductor based) processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. The example profile accessor 210 accesses a profile and/or trace for a function from the server 130. In examples disclosed herein, the profile accessor 210 accesses the profile and/or trace from the server 130 periodically (e.g., hourly, daily, weekly, etc.) However, in some examples, the profile accessor 210 may access the profile and/or trace from the server 130 a-periodically (e.g., upon execution of a corresponding function at the server 130, upon request from a user via the dashboard 260, etc.). In some examples, the profile accessor 210 additionally identifies a function (e.g., via function label, a function name, etc.) associated with the profile and/or trace.

The example pattern detector 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example pattern detector 220 detects a pattern from the profile and/or trace. In examples disclosed herein, the pattern may include, for example, detection of optimized blocking loops that could be parallelized, repetitive accesses to network, memory, and/or input/output (I/O) with similar patterns, calls for functions where hardware features are available (e.g., Advanced Encryption Standard New Instructions (AESNI) functions), etc. Patterns may be detected using any pattern matching and/or detection technique. In some examples, patterns are detected based on names of function calls (e.g., sub-routines) and/or libraries used in execution of the function.

The example adaptation identifier 225 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. Using the model stored in the example model data store 240, the example adaptation identifier 225 identifies possible adaptations to the code. The example adaptation identifier 225 identifies the possible adaptations based on adaptation definitions, sometimes referred to as recipe(s), stored in the model data store. In examples disclosed herein, the adaptations (e.g., recipes) represent inserted code segments that may be added to increase performance of the execution of the code. However, any other code modifications may additionally or alternatively be implemented by the adaptation(s) including, for example, usage of specialized libraries (e.g., should access patterns be detected that are best handled by Non-Volatile Memory (NVM), code blocks/functions can be adapted to make use of libraries that bypass the filesystem and allows for better performance; should access patterns be detected to make use of Multi-Core Architectures on CPUs & GPUs, certain kernels can be brought into the code; etc.), annotations with pragma statements (e.g., a pragma statement indicating that a "for loop" is to be executed in a parallel fashion, etc.)

The example model processor 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model processor 230 executes a machine learning model to predict performance impacts of those possible adaptations. In examples disclosed herein, the performance impact is measured in total execution time (e.g., in seconds) of the function, as the total time of execution of a function is the most visible execution parameter to an end user of the FaaS system. However, in some examples, other execution parameters may additionally or alternatively be used such as, for example, processor cycles, memory usage, disk access, network access, etc. In some examples, the example model processor 230 determines a prediction confidence of the calculated performance impact(s). In some examples, the prediction confidence is a parameter and/or metadata associated with the model (e.g., the model accuracy). However, in some examples, the prediction confidence may represent an additional output of the execution of the model.

The example model data store 240 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example model data store 240 may be in any data format such as, for example, binary data, comma delimited data, tab delimited data, structured query language (SQL) structures, etc. While, in the illustrated example, the model data store 240 is illustrated as a single device, the example model data store 240 and/or any other data storage devices described herein may be implemented by any number and/or type(s) of memories. In the illustrated example of FIG. 2, the example model data store 240 stores model(s) corresponding to various execution patterns that relate code to performance metrics. The example model data store 240 also stores adaptation strategies (e.g., recipes) that may be used to adapt code.

The example result comparator 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. Using the information provided by the model processor 230, the example result comparator 250 selects a possible adaptation based on the performance impact and/or the prediction confidence. In examples disclosed herein, the possible adaptation with the highest performance impact is chosen. However, in some examples, other parameters may additionally or alternatively be used to select a possible adaptation (e.g., the predicted confidence, a combination of the predicted confidence and the performance impact, etc.)

The example dashboard 260 of the illustrated example of FIG. 2 is implemented by a web server interface (e.g., a hypertext transfer protocol (HTTP) server) that allows a user (e.g., a developer) to access the recommendations provided by the adaptation controller. In some examples, the example dashboard 260 may be implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. to provide a user interface. In some examples, the dashboard 260 may be implemented using a graphical user interface displayed via a display and that is to accept user inputs via, for example, a keyboard and/or a mouse.

The example instruction editor 270 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example instruction editor 270 modifies the code according to a selected adaptation. In some examples, the selected adaptation is applied automatically (e.g., if the expected performance and/or prediction confidence meet corresponding thresholds). In some examples, the selected adaptation is applied in response to an instruction from a developer (e.g., via the dashboard 260). Upon editing the code, the example instruction editor 270 provides the modified code to the repository 110.

The example model trainer 280 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), etc. The example model trainer 280 performs training of model(s) stored in the example model data store 240. Different types of training may be performed based on the type of ML/AI model and/or the expected output. For example, supervised training uses inputs (e.g., instruction(s) samples) and corresponding expected outputs (e.g., performance metrics), sometimes referred to as a label, to select parameters (e.g., by iterating over combinations of select parameters) for the ML/AI model that reduce model error. As used herein, the label refers to an expected output of the machine learning model (e.g., a classification, an expected output value, an expected performance metric, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

The example model trainer 280 causes the example model processor 230 to evaluate the model using the training data to create an output. In examples where a prior model had not been created, the model may be initialized in the knowledge base (e.g., if the model associated with the pattern did not previously exist). The example model trainer 280 determines whether the output of the model and/or, more generally, the model, is accurate. In examples disclosed herein, the accuracy of the model is determined using a loss function (e.g., to compare the generated outputs to the expected outputs), and compares the accuracy to an accuracy threshold. That is, training is performed until the threshold amount of model accuracy is achieved (e.g., a model accuracy of greater than 90%). However, in some examples, other conditions may additionally or alternatively be used to determine when to end training such as, for example, an amount of time used to train the model, a number of training iterations used, etc. In examples disclosed herein, training is performed using hyperparameters that control how the learning is performed (e.g., a learning rate, a number of layers to be used in the machine learning model, etc.).

While an example manner of implementing the example adaptation controller 140 of FIG. 1 is illustrated in FIG. 2, one or more of the elements, processes and/or devices illustrated in FIG. 2 may be combined, divided, re-arranged, omitted, eliminated and/or implemented in any other way. Further, the example profile accessor 210, the example pattern detector 220, the example adaptation identifier 225, the example model processor 230, the example result comparator 250, the example dashboard 260, the example instruction editor 270, the example model trainer 280, and/or, more generally, the example adaptation controller 140 of FIGS. 1 and/or 2 may be implemented by hardware, software, firmware and/or any combination of hardware, software and/or firmware. Thus, for example, any of the example profile accessor 210, the example pattern detector 220, the example adaptation identifier 225, the example model processor 230, the example result comparator 250, the example dashboard 260, the example instruction editor 270, the example model trainer 280, and/or, more generally, the example adaptation controller 140 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example profile accessor 210, the example pattern detector 220, the example adaptation identifier 225, the example model processor 230, the example result comparator 250, the example dashboard 260, the example instruction editor 270, the example model trainer 280, and/or, more generally, the example adaptation controller 140 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example adaptation controller 140 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
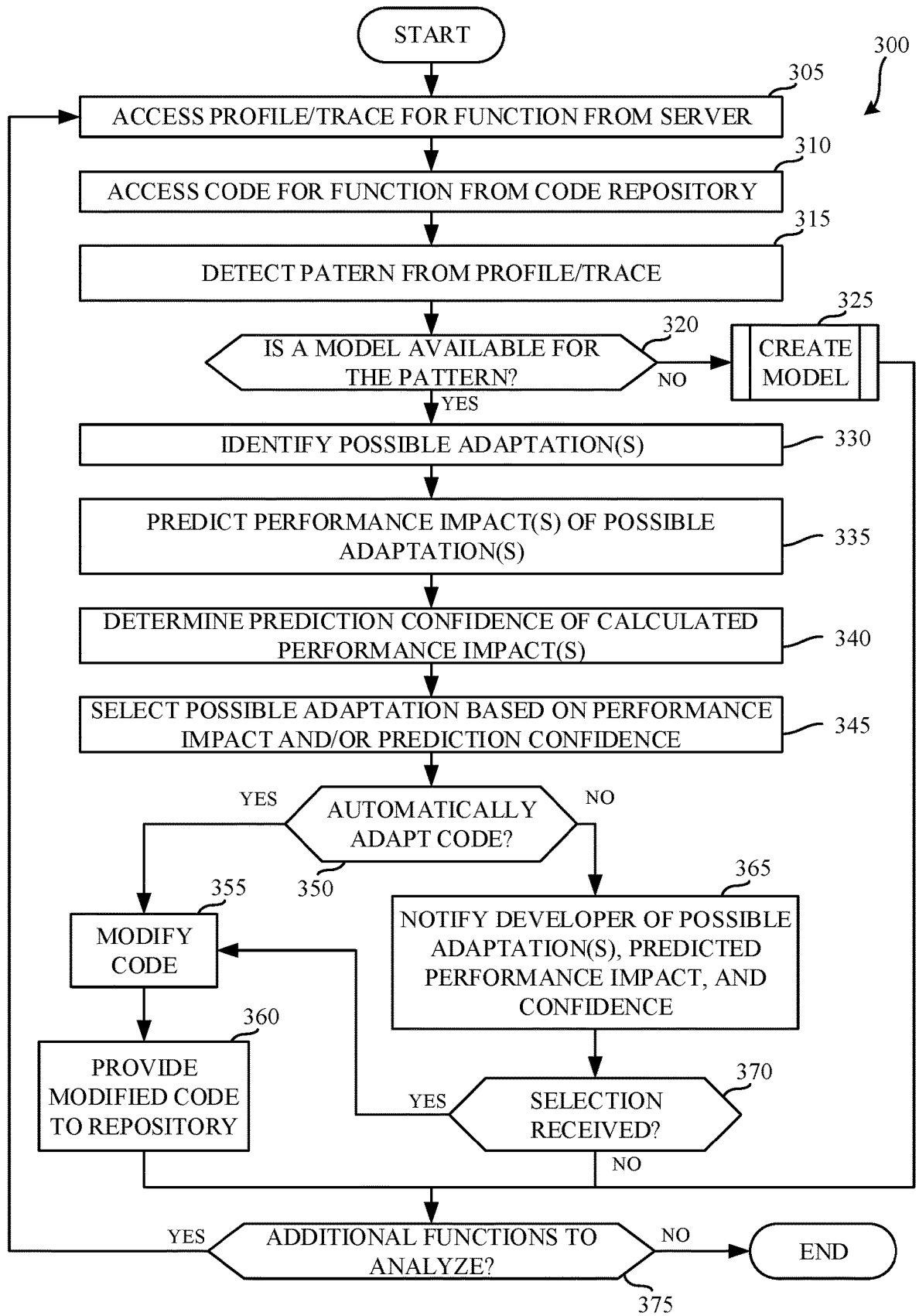
FIG. 3 is a flowchart representative of example machine readable instructions which may be executed to implement the example adaptation controller of FIGS. 1 and/or 2.

Flowcharts representative of example hardware logic, machine readable instructions, hardware implemented state machines, and/or any combination thereof for implementing the example adaptation controller 140 of FIGS. 1 and/or 2 are shown in FIGS. 3 and/or 4. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3 and/or 4, many other methods of implementing the example adaptation controller 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of machine readable instructions which may be executed to implement the example adaptation controller of FIGS. 1 and/or 2. The example process 300 of FIG. 3 begins when the example profile accessor 210 accesses a profile and/or trace for a function from the server 130. (Block 305). In examples disclosed herein, the profile accessor 210 accesses the profile and/or trace from the server 130 periodically (e.g., hourly, daily, weekly, etc.) However, in some examples, the profile accessor 210 may access the profile and/or trace from the server 130 a periodically (e.g., upon execution of a corresponding function at the server 130, upon request from a user via the dashboard 260, etc.).

The example instruction editor 270 accesses the instruction(s) for the function from the instruction repository 110. (Block 310). The example pattern detector 220 detects a pattern from the profile and/or trace. (Block 315). In examples disclosed herein, the pattern may include, for example, detection of optimized blocking loops that could be parallelized, repetitive accesses to network, memory, and/or input/output (I/O) with similar patterns, calls for functions where hardware features are available (e.g., Advanced Encryption Standard New Instructions (AESNI) functions), etc.

The example model processor 230 determines whether there is a model available in the example model data store 240 for use in connection with the identified pattern. (Block 320). In some examples, the models stored in the example model data store 240 represent trained models (e.g., models trained by the model processor 230 and/or the model trainer 280). However, in some examples and models stored in the example model data store 240 may include models that are provided by a vendor.

If the example model processor 230 determines that there is no model available for use in connection with the identified pattern (e.g., block 320 returns a result of NO), the example model processor 230 and/or model trainer 280 create a model for storage in the model data store 240. (Block 325). In general, implementing a ML/AI system involves two phases, a learning/training phase and an inference phase. In the learning/training phase, a training algorithm is used to train a model to operate in accordance with patterns and/or associations based on, for example, training data. An example approach for creating and/or training a model is described in further detail in connection with FIG. 4. In the context of a ML/AI system, the remainder of FIG. 3, represents the inference phase (e.g., where the trained model is used to create inferences and/or trained outputs).

Using the model stored in the example model data store 240, the example adaptation identifier 225 identifies possible adaptations to the instruction(s). (Block 330). The example adaptation identifier 225 identifies the possible adaptations based on adaptation definitions, sometimes referred to as recipe(s), stored in the model data store. In examples disclosed herein, the adaptations (e.g., recipes) represent inserted code segments that may be added to increase performance of the execution of the instruction(s). However, any other modifications may additionally or alternatively be implemented by the adaptation(s) including, for example, usage of specialized libraries (e.g., should access patterns be detected that are best handled by Non-Volatile Memory (NVM), code blocks/functions can be adapted to make use of libraries that bypass the filesystem and allows for better performance; should access patterns be detected to make use of Multi-Core Architectures on CPUs & GPUs, certain kernels can be brought into the instruction(s); etc.), annotations with pragma statements (e.g., a pragma statement indicating that a for loop is to be executed in a parallel fashion, etc.) An example pragma statement is described in further detail below in connection with FIG. 7.

The example model processor 230 predicts performance impacts of those possible adaptations. (Block 335). In examples disclosed herein, the performance impact is measured in total execution time (e.g., in seconds) of the function, as the total time of execution of a function is the most visible execution parameter to an end user of the FaaS system. However, in some examples, other execution parameters may additionally or alternatively be used such as, for example, processor cycles, memory usage, disk access, network access, etc.

The example model processor 230 determines a prediction confidence of the calculated performance impact(s). (Block 340). In some examples, the prediction confidence is a parameter of the model (e.g., the model accuracy). However, in some examples, the prediction confidence may represent an additional output of the execution of the model. The example result comparator 250 selects a possible adaptation based on the performance impact and/or the prediction confidence. (Block 345). In examples disclosed herein, the possible adaptation with the highest performance impact is chosen. However, in some examples, other parameters may additionally or alternatively be used to select a possible adaptation (e.g., the predicted confidence, a combination of the predicted confidence and the performance impact, etc.)

The example result comparator 250 then determines whether to automatically adapt the instruction(s) according to the selected adaptation. (Block 350). The determination of whether to automatically adapt the instruction(s) enables the adaptation controller 140 to, in some examples, modify instruction(s) stored in the instruction repository 110 without requiring intervention (e.g., approval) of a user. Determination of whether to automatically adapt the instruction(s) may be made based on the predicted performance impact and/or the prediction confidence. For example, the result comparator 250 may determine that the adaptation is to be applied when the performance impact is greater than a threshold improvement (e.g., a 70% estimated improvement in performance). In some examples, the result comparator 250 may additionally or alternatively consider whether the estimated confidence of the predicted performance improvement meets a confidence threshold. For example, the result comparator 250 might choose to automatically adapt instruction(s) only when a confidence level of the predicted performance impact is high (e.g., greater than or equal 50%).

In examples disclosed herein, such thresholds are user configurable via the dashboard 260. As a result, the developer can take advantage of the prediction confidence without needing to be immediately involved and/or can configure the system to reduce the likelihood that a modification might be applied without involvement of the developer. For example, in a safety critical system, the developer may desire to choose only modifications with a high threshold confidence level (e.g., a threshold confidence level greater than or equal to 90%). However, in some other systems, a developer could be interested in choosing a prediction with reduced confidence level for adoption because the predicted impact is high (e.g., allow selection of a proposed modification when there is a 10% confidence score but a 90% performance impact). In some examples, the thresholds may be set such that no instruction(s) adaptations are automatically applied.

If the example result comparator 250 determines that the instruction(s) should be automatically adapted (e.g., block 350 returns a result of YES), the example instruction editor 270 modifies the instruction(s) according to the selected adaptation. (Block 355). The example instruction editor 270 then provides the modified instruction(s) to the instruction repository 110. (Block 360). Upon providing the instruction(s) to the instruction repository 110, the example CI/CD framework 120 will process the modified instruction(s) and release the processed instruction(s) to the server 130 for execution.

Returning to block 350, if the example result comparator 250 determines that the instruction(s) should not be automatically adapted (e.g., block 350 returns result of NO), the example dashboard 260 notifies the developer of possible adaptations, addicted performance impacts and/or the confidence levels associated therewith. (Block 365). In some examples, a notification may be provided via, for example, an email, a short message service (SMS) message, etc.

The example dashboard 260 then determines whether a selection to apply a proposed adaptation is received. (Block 370). For example, the developer may instruct the adaptation controller 140 to apply an instruction(s) modification proposed via the dashboard 260. If the example dashboard determines that no selection has been received (e.g., block 370 returns a result of NO) the example profile accessor 210 determines whether there are any additional functions to be analyzed. (Block 375). The example process of blocks 305-375 is then repeated until all functions have been analyzed (e.g., until block 375 returns a result of NO).

Returning to block 370, upon receiving the selection, (e.g., block 370 returning result of YES), control proceeds to block 355 where the example instruction editor 270 modifies the instruction(s) (block 355) and provides the modified instruction(s) to the repository 110. (Block 360). While in the illustrated example of FIG. 3 the receipt of the instruction of the developer (e.g., the selection of whether to apply a proposed modification) is illustrated as a serial process, the instruction of the developer need not block and/or prohibit the execution of the remainder of the instructions of FIG. 3. For example, after notifying the developer, the example process may proceed to block 375 where the example profile accessor 210 determines whether there are any additional functions to be analyzed. The selection of the developer of whether to apply a proposed instruction(s) modification may be received and handled accordingly at a later time.

Figure 4:
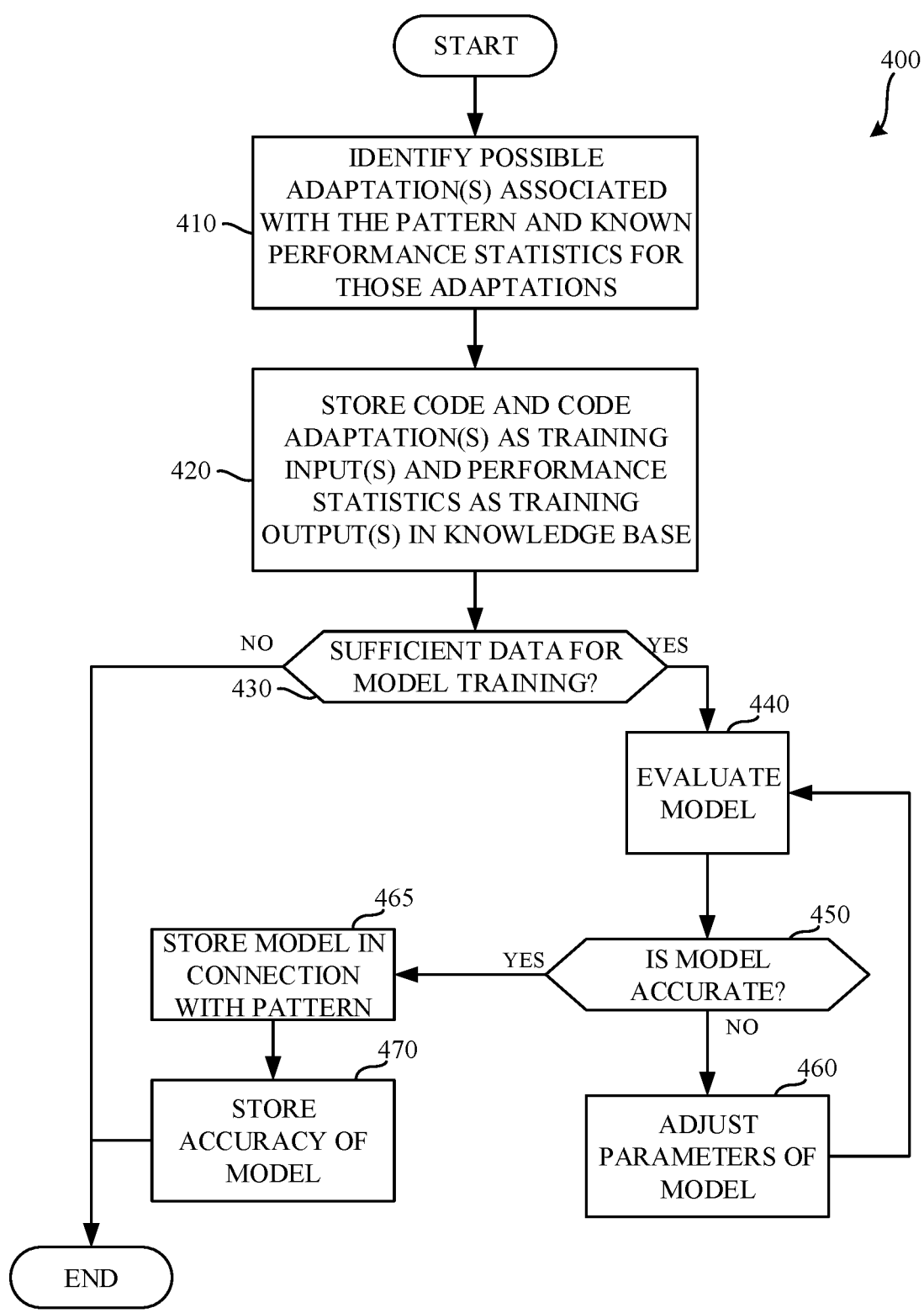
FIG. 4 is a flowchart representative of example machine readable instructions which may be executed to implement the example adaptation controller of FIGS. 1 and/or 2 to train a machine learning model.

FIG. 4 is a flowchart representative of machine readable instructions which may be executed to implement the example adaptation controller of FIGS. 1 and/or 2 to train a machine learning model. As noted above, implementing an ML/AI system involves two phases, a learning/training phase and an inference phase. FIG. 4 represents the learning/training phase, in which a training algorithm is used to train a model to operate in accordance with patterns and/or associations based on, for example, training data. In examples disclosed here, separate models are trained for each pattern. However, in some examples, a single model may be used and the pattern may be supplied as a training input. Using separate models for each corresponding pattern results in trained models that are less computationally demanding to execute (e.g., can be more efficiently executed) than a single model that accounts for all patterns.

The example process 400 of FIG. 4 begins when the example adaptation identifier 225 identifies possible adaptation(s) associated with the detected pattern (detected in block 315) and known performance statistics (e.g., metrics) for those adaptation(s). (Block 410). The example model trainer 280 stores the instruction(s) and possible adaptation(s) to the instruction(s) as training input(s) and the corresponding performance statistics as training output(s) in the model data store 240. (Block 420).

The example model trainer 280 determines whether there is sufficient data for training of a model in connection with the pattern. (Block 430). In examples disclosed herein, the example model trainer 280 determines that there is sufficient data when there is a threshold amount of training inputs (e.g., ten or more training inputs) in connection with the pattern for which a model is to be trained. In some examples, the example model trainer 280 may determine that there is sufficient data to train the model when a model previously exists in the knowledge base for the pattern. In such an example, training may be performed using additional training data to attempt to improve the previously stored model.

Different types of training may be performed based on the type of ML/AI model and/or the expected output. For example, supervised training uses inputs (e.g., code samples) and corresponding expected outputs (e.g., performance metrics) to select parameters (e.g., by iterating over combinations of select parameters) for the ML/AI model that reduce model error. As used herein, labeling refers to an expected output of the machine learning model (e.g., a classification, an expected output value, an expected performance metric, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

If sufficient data exists for training a model (e.g., block 430 returns a result of YES), the example model trainer 280 in connection with the model processor 230 evaluates the model for training purposes. (Block 440). In examples where a prior model had not been created, the model may be initialized in the knowledge base (e.g., if the model associated with the pattern did not previously exist). To evaluate the model, the example model trainer 280 causes the model processor 230 to execute the model and return an output.

The example model trainer 280 determines whether the output of the model and/or, more generally, the model, is accurate. (Block 450). In examples disclosed herein, the accuracy of the model is determined using a loss function (e.g., to compare the generated outputs to the expected outputs), and compares the accuracy to an accuracy threshold. That is, training is performed until the threshold amount of model accuracy is achieved (e.g., a model accuracy of greater than 90%). However, in some examples, other conditions may additionally or alternatively be used to determine when to end training such as, for example, an amount of time used to train the model, a number of training iterations used, etc. In examples disclosed herein, training is performed using hyperparameters that control how the learning is performed (e.g., a learning rate, a number of layers to be used in the machine learning model, etc.).

If the model is not accurate (e.g., block 450 returns a result of NO), the example model trainer 280 adjusts parameters of the model. (Block 460). In examples disclosed herein, ML/AI model parameters are adjusted using stochastic gradient descent. However, any other training algorithm may additionally or alternatively be used. The example model trainer 280 then initiates re-evaluation of the model. (Block 440). The example process of blocks 440 through 460 is repeated until the threshold model accuracy is achieved (and/or other training conditions are met) (e.g., until block 450 returns a result of YES).

As noted above, training is performed using training data. In examples disclosed herein, the training data originates from instruction(s) and/or proposed modifications to instruction(s), in connection with output performance metrics. Because supervised training is used, the training data is labeled. Labeling is applied to the training data by associating the output performance metrics with the instruction(s) and/or proposed modifications to the instruction(s). In some examples, the training data is pre-processed using, for example, natural language processing, syntax detection, search parameters, etc. to detect particular patterns, function calls, programming structures, etc. in the instruction(s). In some examples, the training data is sub-divided into a training set and a validation set to allow for calculation of an accuracy of the generated model.

Once training is complete (e.g., block 450 returns a result of YES), the example model trainer 280 stores the model in connection with the pattern. (Block 465). Once stored, the model is deployed for use as an executable construct that processes an input and provides an output based on the network of nodes and connections defined in the model. The model is stored at the example model data store 240. The model may then be executed by the model processor 230.

The example model trainer 280 stores an accuracy of the model. (Block 470). The accuracy of the model may be determined by, for example, evaluating the model using a validation data set and comparing the resultant output of the model to the expected outputs (associated with the input training data in the validation set). The accuracy of the model may be later used during the inference phase to determine the confidence of the output of the model.

Once trained, the deployed model may be operated in an inference phase (e.g., in the context of FIG. 3) to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples re-training may be performed. Such re-training may be performed in response to, for example, a new pattern being detected, a threshold amount of time being reached since a prior training, an instruction received from a user/developer, etc.

Figure 5:
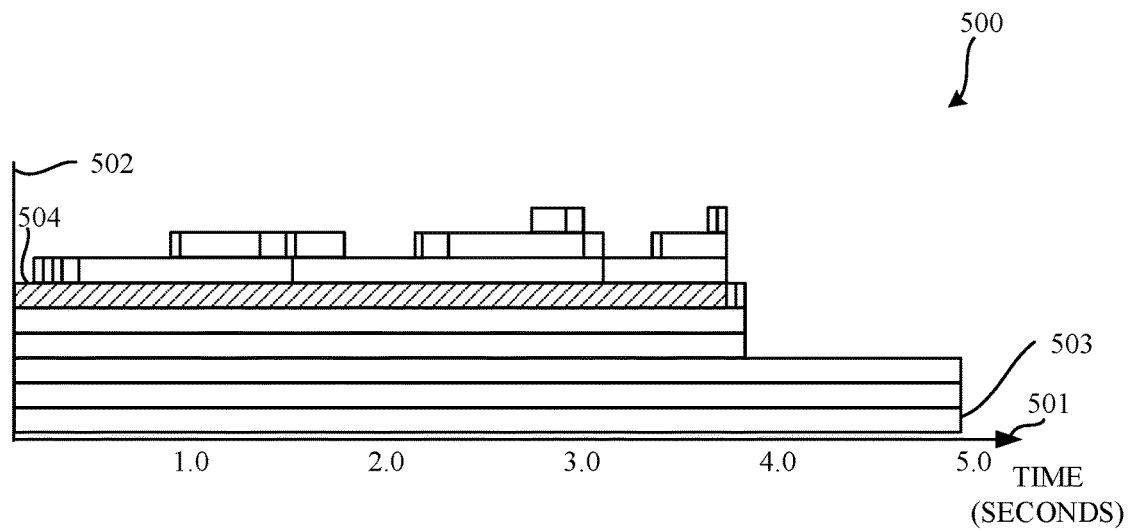
FIG. 5 is a diagram representing an example execution profile of a function.

FIG. 5 is a diagram representing an example execution profile of a function. The example diagram 500 of FIG. 5 shows a stack trace for a non-optimized execution. The example diagram 500 of FIG. 5 includes a horizontal axis 501 and a vertical axis 502. The horizontal axis 501 represents time. The horizontal axis 501 represents an approximate time of five seconds to execute the main function call 503. The vertical axis 502 represents sub-function calls (e.g., internal calls to other functions as a result of the main function call). Each block in FIG. 5 represents a function call and how long the function call took to execute. The $4^{th}$ bar from the top 504 indicates that the function execution spends a lot of time in a certain routine (in this case a MandelBrot-Calculate routine). In the illustrated example of FIG. 5, no optimization libraries have been loaded (such as OpenMP). By performing a scan for the routine taking up the most time, it can be determined that there is a "for loop" in place that can be optimized.

Figure 6:
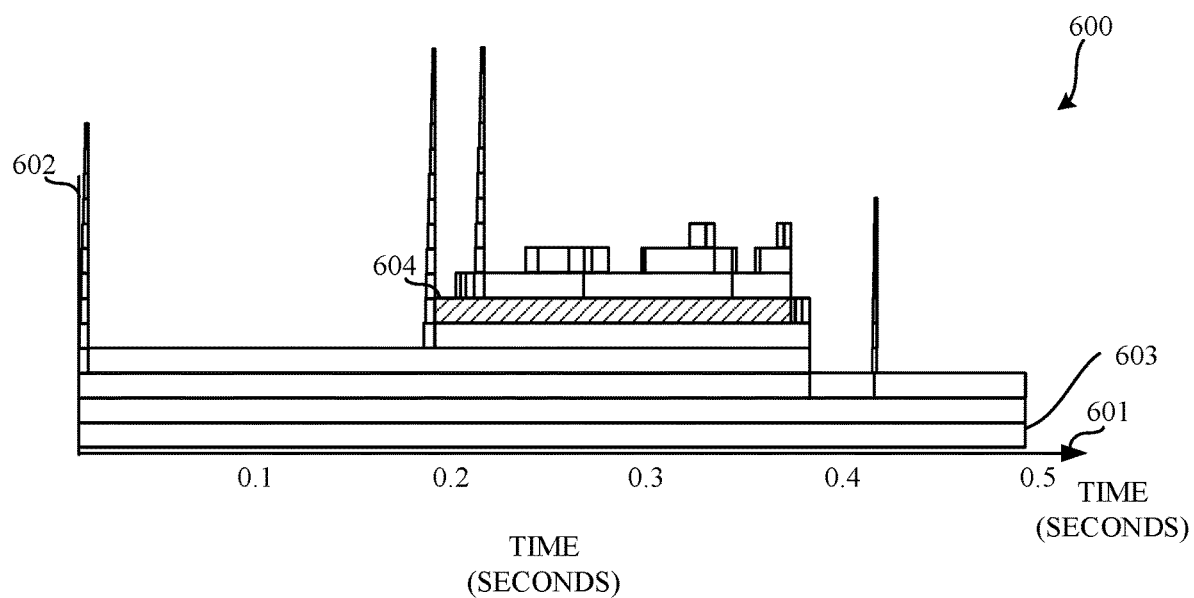
FIG. 6 is a diagram representing an example execution profile of a function as modified based on a recommendation by the adaptation controller of FIGS. 1 and/or 2.

FIG. 6 is a diagram representing an example execution profile of a function as modified based on a recommendation by the adaptation controller of FIGS. 1 and/or 2. The example diagram 600 of FIG. 6 shows a stack trace for an optimized execution. The example diagram 600 of FIG. 6 includes a horizontal axis 601 and a vertical axis 602. The horizontal axis 601 represents time. The horizontal axis 601 represents an approximate time of one-half second to execute the main function call 603. The vertical axis 602 represents sub-function calls (e.g., internal calls to other functions as a result of the main function call). Block 604 of FIG. 6 represents the MandelBrotCalculate routine (corresponding to block 504 of FIG. 5) being executed.

In contrast to the example of FIG. 5, where a for loop was found that was not optimized, that for loop can be annotated with pragmas and result in the stack trace of FIG. 6. FIG. 7 represents an example instruction(s) optimization that may be recommended by the example adaptation controller of FIGS. 1 and/or 2. FIG. 7 includes a block of instruction(s) 700 that includes an inserted pragma command 710. The example pragma command 710 causes the subsequent for loop to be executed using an OpenMP library, and to be executed in parallel. Returning to FIG. 6, when executing the modified function, the overall runtime of the function is reduced by approximately a factor of ten (e.g., approximately five seconds vs. one-half second).

Figure 8:
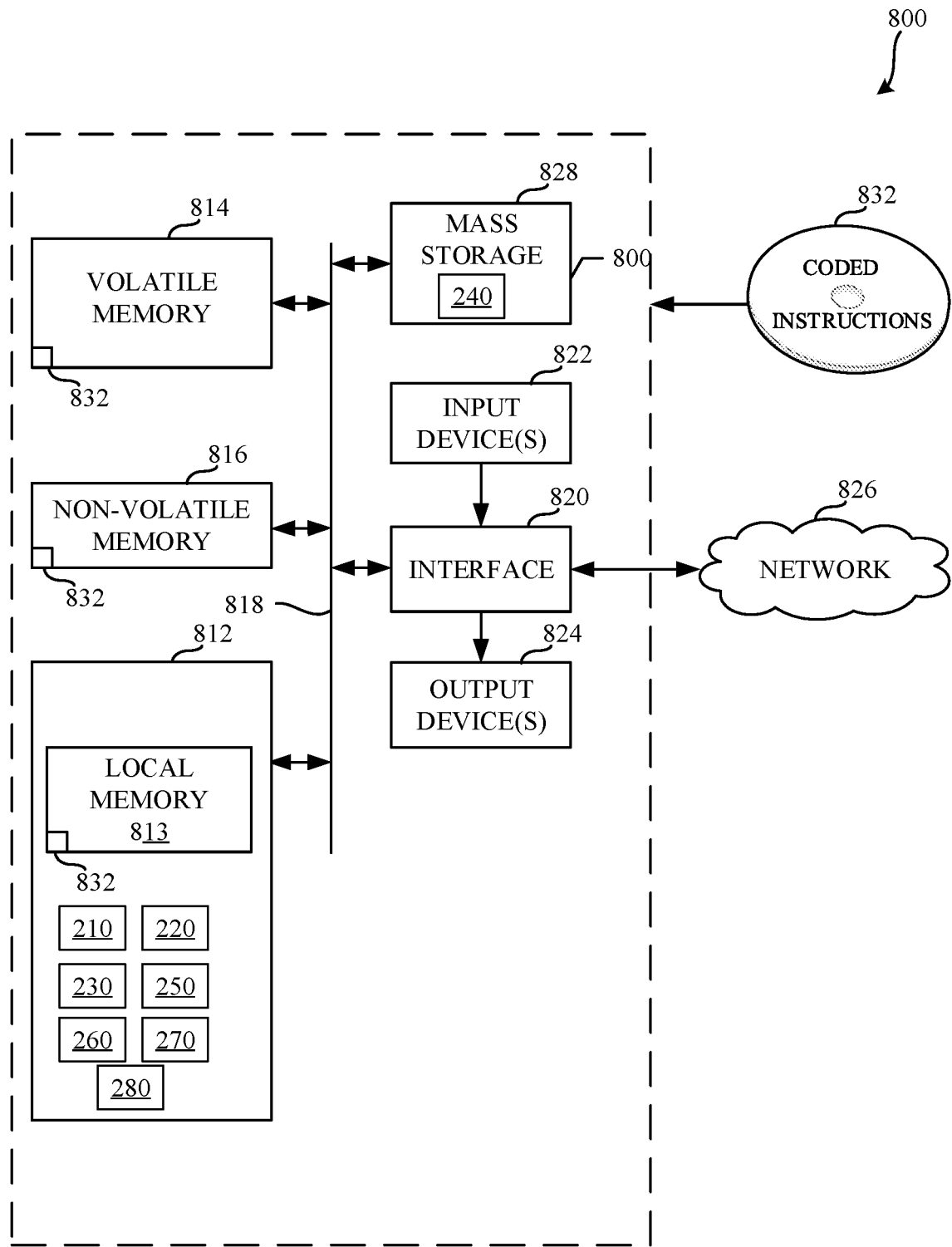
FIG. 8 is a block diagram of an example processing platform structured to execute the instructions of FIGS. 3 and/or 4 to implement the example adaptation controller of FIGS. 1 and/or 2.

FIG. 8 is a block diagram of an example processor platform 800 structured to execute the instructions of FIGS. 3 and/or 4 to implement the example adaptation controller 140 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example profile accessor 210, the example pattern detector 220, the example adaptation identifier 225, the example model processor 230, the example result comparator 250, the example dashboard 260, the example instruction editor 270, and the example model trainer 280.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3 and/or 4 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that enable recommendation of adaptations of instruction(s) deployed in a function as a service (FaaS) environment. Disclosed methods, apparatus and articles of manufacture improve the efficiency of using a computing device by enabling recommendations to be provided to developers concerning performance of their instruction(s) in a production environment. Such recommendations are selected based on predicted performance improvements, as well as (in some cases), a confidence of that prediction. Utilizing those recommendations results in instruction(s) that is better performing (e.g., completes more quickly, utilizes fewer resources, etc.) at the server 130. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example 1 includes an apparatus for recommending instruction adaptations to improve compute performance, the apparatus comprising a pattern detector to detect an execution pattern from an execution profile provided by a server, the execution profile associated with an instruction stored in an instruction repository, an adaptation identifier to identify a possible instruction adaptation that may be applied to the instruction associated with the execution pattern, a model processor to execute a machine learning model to predict an expected performance improvement of the adaptation, a result comparator to determine whether the expected performance improvement meets a threshold, and an instruction editor to, in response to the result comparator determining that the expected performance improvement meets the threshold, apply the possible instruction adaptation to the instruction in the instruction repository.

Example 2 includes the apparatus of example 1, further including a profile accessor to access the execution profile from the server.

Example 3 includes the apparatus of example 2, wherein the server is to operate in a function as a service environment.

Example 4 includes the apparatus of example 1, wherein the model processor is further to determine a confidence of the expected performance improvement, and the instruction editor is to apply the possible instruction adaptation in response to the result comparator determining that the confidence meets a confidence threshold.

Example 5 includes the apparatus of example 1, further including a dashboard output a notice of the possible adaptation.

Example 6 includes the apparatus of example 5, wherein the instruction editor is to apply the possible instruction adaptation in response to an instruction received via the dashboard.

Example 7 includes the apparatus of example 1, wherein the adaptation includes insertion of a pragma statement into the instruction.

Example 8 includes At least one non-transitory computer readable storage medium comprising instructions that, when executed, cause at least one processor to at least detect an execution pattern from an execution profile associated with code in an instruction repository, identify a possible adaptation that may be applied to the code based on the execution pattern, execute a machine learning model to predict an expected performance improvement of the adaptation, determine whether the expected performance improvement meets an improvement threshold, in response to the determining that the expected performance improvement meets the improvement threshold, apply the possible adaptation to the code.

Example 9 includes the at least one computer readable storage medium of example 8, wherein execution pattern is accessed from a server that is to operate in a function as a service environment.

Example 10 includes the at least one computer readable storage medium of example 8, wherein the instructions, when executed, cause the at least one processor to determine a prediction confidence of the expected performance improvement, and apply the possible adaptation in response to a determination that the prediction confidence meets a confidence threshold.

Example 11 includes the at least one computer readable storage medium of example 8, wherein the instructions, when executed, cause the at least one processor to notify a developer associated with the code of the possible adaptation.

Example 12 includes the at least one computer readable storage medium of example 11, wherein the instructions, when executed, cause the at least one processor to apply the possible adaptation in response to an instruction from the developer.

Example 13 includes the at least one computer readable storage medium of example 8, wherein the adaptation includes insertion of a pragma statement into the code.

Example 14 includes a method for recommending instruction adaptations to improve compute performance, the method comprising detecting an execution pattern from an execution profile provided by a server, the execution profile associated with an instruction stored in an instruction repository, identifying a possible instruction adaptation that may be applied to the instruction associated with the execution pattern, predicting, using a machine learning model, an expected performance improvement of the adaptation, determining whether the expected performance improvement meets a threshold, and in response to determining that the expected performance improvement meets the threshold, applying the possible instruction adaptation to the instruction.

Example 15 includes the method of example 14, wherein the server is to operate in a function as a service environment.

Example 16 includes the method of example 14, further including determining a confidence of the expected performance improvement, and the applying of the possible instruction adaptation is further performed in response to a determination that the confidence meets a confidence threshold.

Example 17 includes the method of example 14, further including notifying a developer associated with the instruction of the possible adaptation.

Example 18 includes the method of example 17, wherein the applying of the possible instruction adaptation is further performed in response to an instruction from the developer.

Example 19 includes the method of any one of example 14, wherein the adaptation includes insertion of a pragma statement into the instruction.

Example 20 includes an apparatus for recommending code adaptations to improve compute performance, the apparatus comprising means for detecting an execution pattern from an execution profile provided by a server, the execution profile associated with code stored in an instruction repository, means for identifying a possible code adaptation that may be applied to the code associated with the execution pattern, means for predicting, using a machine learning model, an expected performance improvement of the adaptation, means for determining whether the expected performance improvement meets a threshold, means for applying, in response to determining that the expected performance improvement meets the threshold, the possible code adaptation to the code. The means for detecting is implemented by the pattern detector 220. The means for identifying is implemented by the adaptation identifier 225. The means for predicting is implemented by the model processor 230. The means for determining is implemented by the result comparator 250.

Example 21 includes the apparatus of example 20, wherein the server is to operate in a function as a service environment.

Example 22 includes the apparatus of example 20, wherein the means for predicting is further to determine a confidence of the expected performance improvement, and the means for applying is to apply the adaptation in response to a determination that the confidence meets a confidence threshold.

Example 23 includes the apparatus of example 20, further including means for notifying a developer associated with the code of the possible adaptation. The means for notifying is implemented by the dashboard 260.

Example 24 includes the apparatus of example 23, wherein the means for applying is further to apply the code adaptation in response to an instruction from the developer.

Example 25 includes the apparatus of example 20, wherein the adaptation includes insertion of a pragma statement into the code.

The following claims are hereby incorporated into this Detailed Description by this reference, with each claim standing on its own as a separate embodiment of the present disclosure.

What is claimed is:

1. A method for recommending instruction adaptations to improve compute performance, the method comprising:
   detecting an execution pattern from an execution profile provided by a server, the execution pattern including repetitive access to network resources, the execution profile associated with an execution environment and an instruction, the instruction written in a development environment corresponding to a first set of features, the instruction stored in an instruction repository monitored by a continuous integration/continuous deployment framework;
   identifying a possible instruction adaptation, the possible instruction adaption corresponding to a second set of features, the second set of features available in the execution environment, the possible instruction adaptation to be applied in response to developer input to the instruction associated with the execution pattern;
   predicting, using a machine learning model, an expected performance improvement of the adaptation;
   determining whether the expected performance improvement meets a threshold; and
   in response to determining that the expected performance improvement meets the threshold, applying the possible instruction adaptation to the instruction, wherein the applying of the possible instruction adaption is to cause the continuous integration/continuous deployment framework to deploy the instruction, the instruction updated to correspond to the second set of features of the execution environment.

2. The method of claim 1, wherein the server is to operate in a function as a service environment.

3. The method of claim 1, further including determining a confidence of the expected performance improvement, and the applying of the possible instruction adaptation is further performed in response to a determination that the confidence meets a confidence threshold.

4. The method of claim 1, further including notifying a developer associated with the instruction of the possible instruction adaptation.

5. The method of claim 4, wherein the applying of the possible instruction adaptation is further performed in response to an instruction from the developer.

6. The method of any one of claim 1, wherein the instruction adaptation includes insertion of a pragma statement into the instruction.

7. The method of claim 1, wherein the execution pattern includes input/output (I/O) with similar patterns.

8. The method of claim 1, wherein the execution pattern includes a call for a function where hardware features are to be used.

9. An apparatus for recommending instruction adaptations to improve compute performance, the apparatus comprising:
   memory storing machine readable instructions;
   at least one processor to execute the machine readable instructions to:
     detect an execution pattern from an execution profile provided by a server, the detected execution pattern including repetitive access to network resources, the execution profile associated with an execution environment and an instruction, the instruction written in a development environment corresponding to a first set of features, the instruction stored in an instruction repository monitored by a continuous integration/continuous deployment framework;
     identify a possible instruction adaptation, the possible instruction adaption corresponding to a second set of features, the second set of features available in the execution environment, the possible instruction adaptation to be applied in response to developer input to the instruction associated with the execution pattern;
     execute a machine learning model to predict an expected performance improvement of the adaptation;
     determine whether the expected performance improvement meets a threshold; and
     in response to the processor determining that the expected performance improvement meets the threshold, apply the possible instruction adaptation to the instruction in the instruction repository, wherein the applying of the possible instruction adaption is to cause the continuous integration/continuous deployment framework to deploy the instruction, the instruction updated to correspond to the second set of features of the execution environment.

10. The apparatus of claim 9, wherein the at least one processor is to execute the machine readable instructions to implement the server to operate in a function as a service environment.

11. The apparatus of claim 9, wherein the at least one processor is to execute the machine readable instructions to access the execution profile from the server.

12. The apparatus of claim 9, wherein the at least one processor is to execute the machine readable instructions to determine a confidence of the expected performance improvement, and apply the possible instruction adaptation in response to the processor determining that the confidence meets a confidence threshold.

13. The apparatus of claim 9, wherein the at least one processor is to execute the machine readable instructions to output a notice of the possible instruction adaptation.

14. The apparatus of claim 13, wherein the at least one processor is to execute the machine readable instructions to apply the possible instruction adaptation in response to an instruction received via the processor.

15. The apparatus of claim 9, wherein the at least one processor is to execute the machine readable instructions to insert a pragma statement into the instruction.

16. The apparatus of claim 9, wherein the execution pattern includes input/output (I/O) with similar patterns.

17. The apparatus of claim 9, wherein the execution pattern includes a call for a function where hardware features are to be used.

18. At least one non-transitory computer readable storage medium comprising instructions that, when executed, cause at least one processor to at least:
 detect an execution pattern, the execution pattern including repetitive access to network resources, from an execution profile associated with an execution environment and with code, the code written in a development environment corresponding to a first set of features, the code stored in an instruction repository monitored by a continuous integration/continuous deployment framework;
 identify a possible adaptation, the possible adaption corresponding to a second set of features, the second set of features available in the execution environment, the possible adaption to be applied in response to developer input to the code based on the execution pattern;
 execute a machine learning model to predict an expected performance improvement of the adaptation;
 determine whether the expected performance improvement meets an improvement threshold; and
 in response to the determining that the expected performance improvement meets the improvement threshold, apply the possible adaptation to the code, wherein the application of the possible adaption is to cause the continuous integration/continuous deployment framework to deploy the code, the code updated to correspond to the second set of features of the execution environment.

19. The at least one computer readable storage medium of claim 18, wherein the execution pattern is accessed from a server that is to operate in a function as a service environment.

20. The at least one computer readable storage medium of claim 18, wherein the instructions, when executed, cause the at least one processor to determine a prediction confidence of the expected performance improvement, and apply the possible adaptation in response to a determination that the prediction confidence meets a confidence threshold.

21. The at least one computer readable storage medium of claim 18, wherein the instructions, when executed, cause the at least one processor to notify a developer associated with the code of the possible adaptation.

22. The at least one computer readable storage medium of claim 21, wherein the instructions, when executed, cause the at least one processor to apply the possible adaptation in response to an instruction from the developer.

23. The at least one computer readable storage medium of claim 18, wherein the possible adaptation includes insertion of a pragma statement into the code.

24. The at least one computer readable storage medium of claim 18, wherein the execution pattern includes input/output (I/O) with similar patterns.

25. The at least one computer readable storage medium of claim 18, wherein the execution pattern includes a call for a function where hardware features are to be used.

26. An apparatus for recommending code adaptations to improve compute performance, the apparatus comprising:
 means for detecting an execution pattern from an execution profile provided by a server, the execution pattern including repetitive access to network resources, the execution profile associated with an execution environment and with code, the code written in a development environment corresponding to a first set of features, the code stored in an instruction repository monitored by a continuous integration/continuous deployment framework;
 means for identifying a possible code adaptation, the possible code adaption corresponding to a second set of features, the second set of features available in the execution environment, the possible code adaptation to be applied in response to developer input to the code associated with the execution pattern;
 means for predicting, using a machine learning model, an expected performance improvement of the adaptation;
 means for determining whether the expected performance improvement meets a threshold; and
 means for applying, in response to determining that the expected performance improvement meets the threshold, the possible code adaptation to the code, wherein the applying of the possible code adaption is to cause the continuous integration/continuous deployment framework to deploy the code, the code updated to correspond to the second set of features of the execution environment.

27. The apparatus of claim 26, wherein the server is to operate in a function as a service environment.

28. The apparatus of claim 26, wherein the means for predicting is further to determine a confidence of the expected performance improvement, and the means for applying is to apply the adaptation in response to a determination that the confidence meets a confidence threshold.

29. The apparatus of claim 26, further including means for notifying a developer associated with the code of the possible code adaptation.

30. The apparatus of claim 29, wherein the means for applying is further to apply the code adaptation in response to an instruction from the developer.

31. The apparatus of claim 26, wherein the code adaptation includes insertion of a pragma statement into the code.

32. The apparatus of claim 26, wherein the execution pattern includes input/output (I/O) with similar patterns.

33. The apparatus of claim 26, wherein the execution pattern includes a call for a function where hardware features are to be used.

\* \* \* \* \*